July 18, 1967  J. H. LESLIE ET AL  3,331,312
STRAP DRAPING SYSTEM
Filed Aug. 24, 1965  5 Sheets-Sheet 1

July 18, 1967  J. H. LESLIE ET AL  3,331,312
STRAP DRAPING SYSTEM
Filed Aug. 24, 1965  5 Sheets-Sheet 2
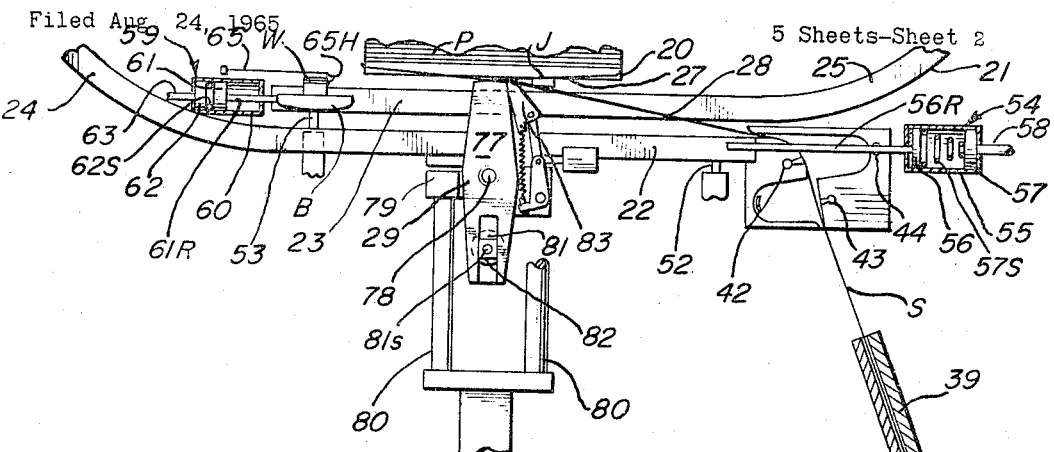
Fig. 2
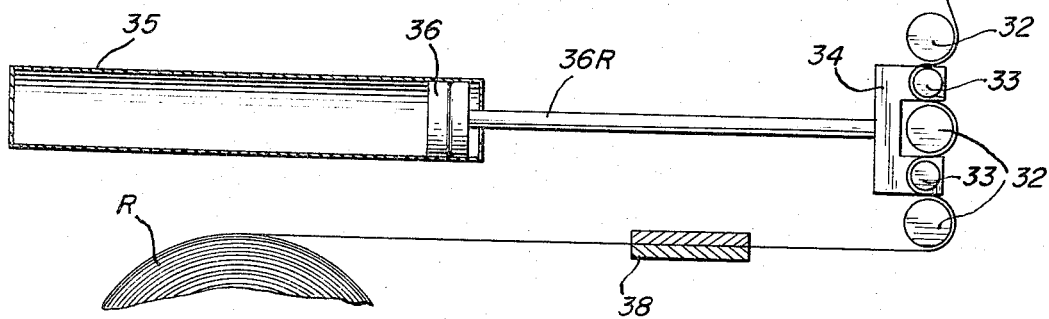
Fig. 3
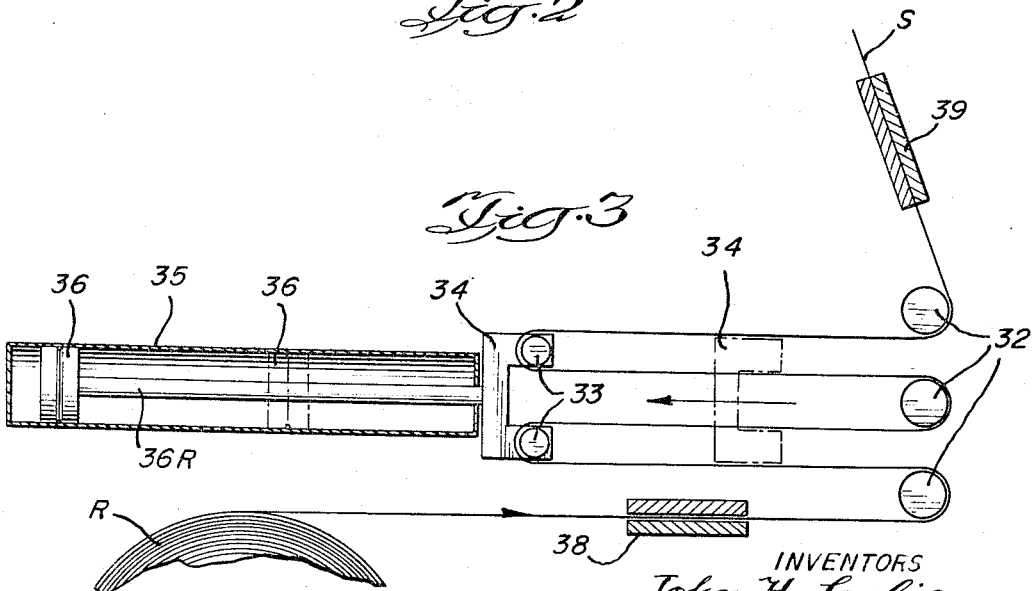
INVENTORS
John H. Leslie
Donald W. Moven
Hobart P. Young
By Dressler, Goldsmith, Clement, Gordon & Ladd
ATTORNEYS

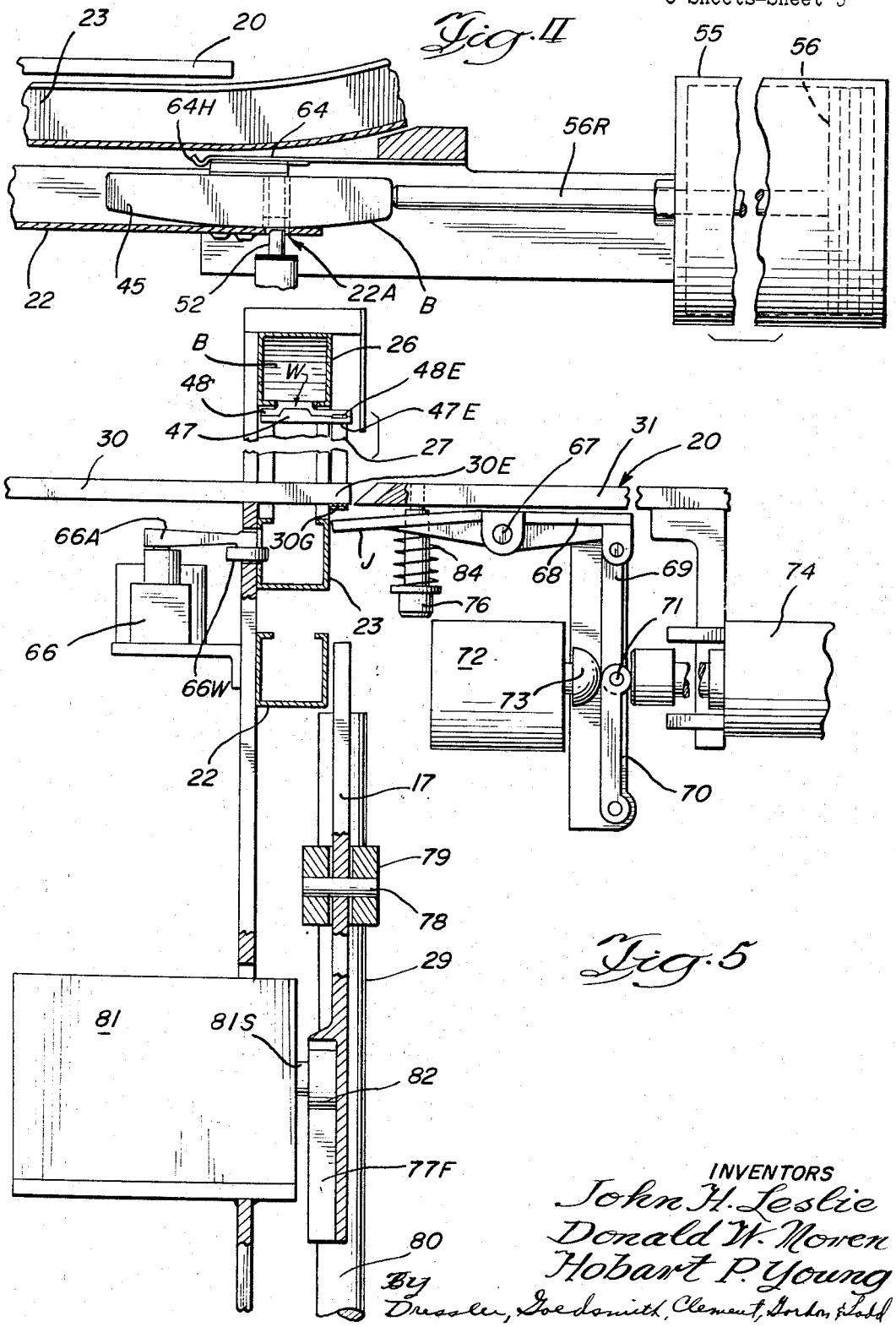

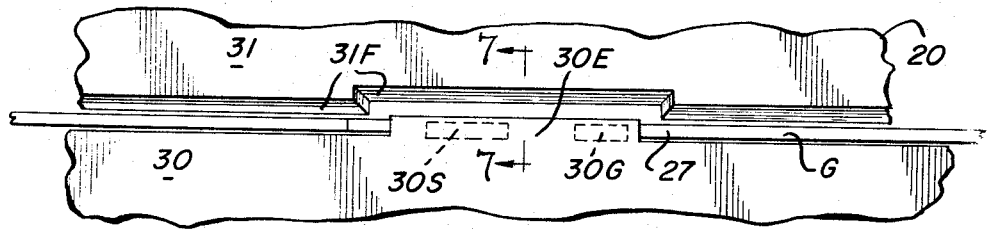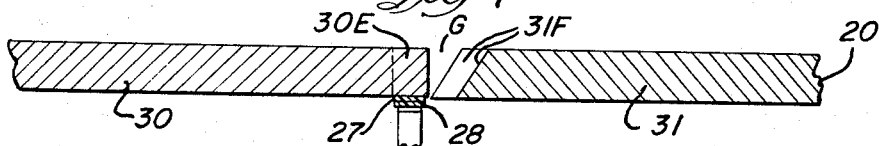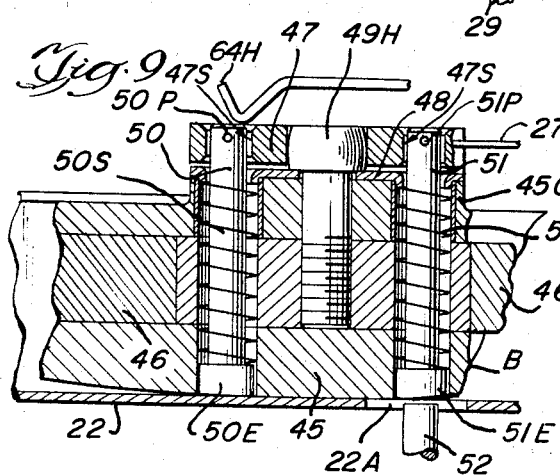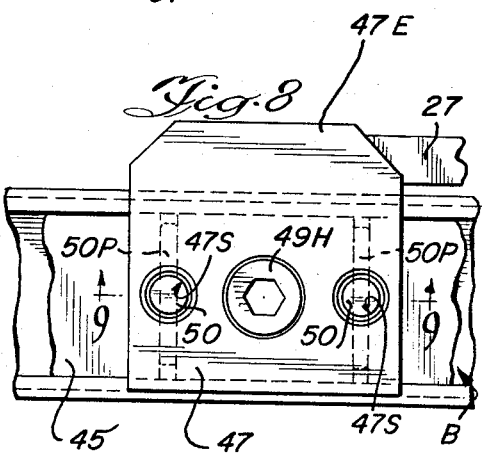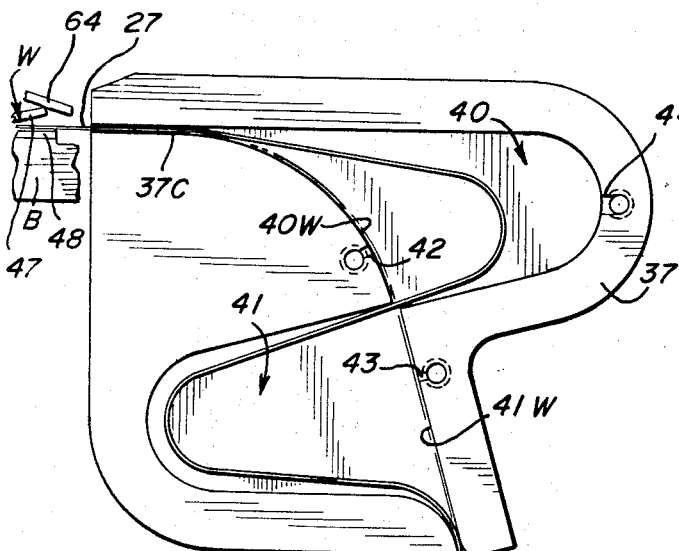

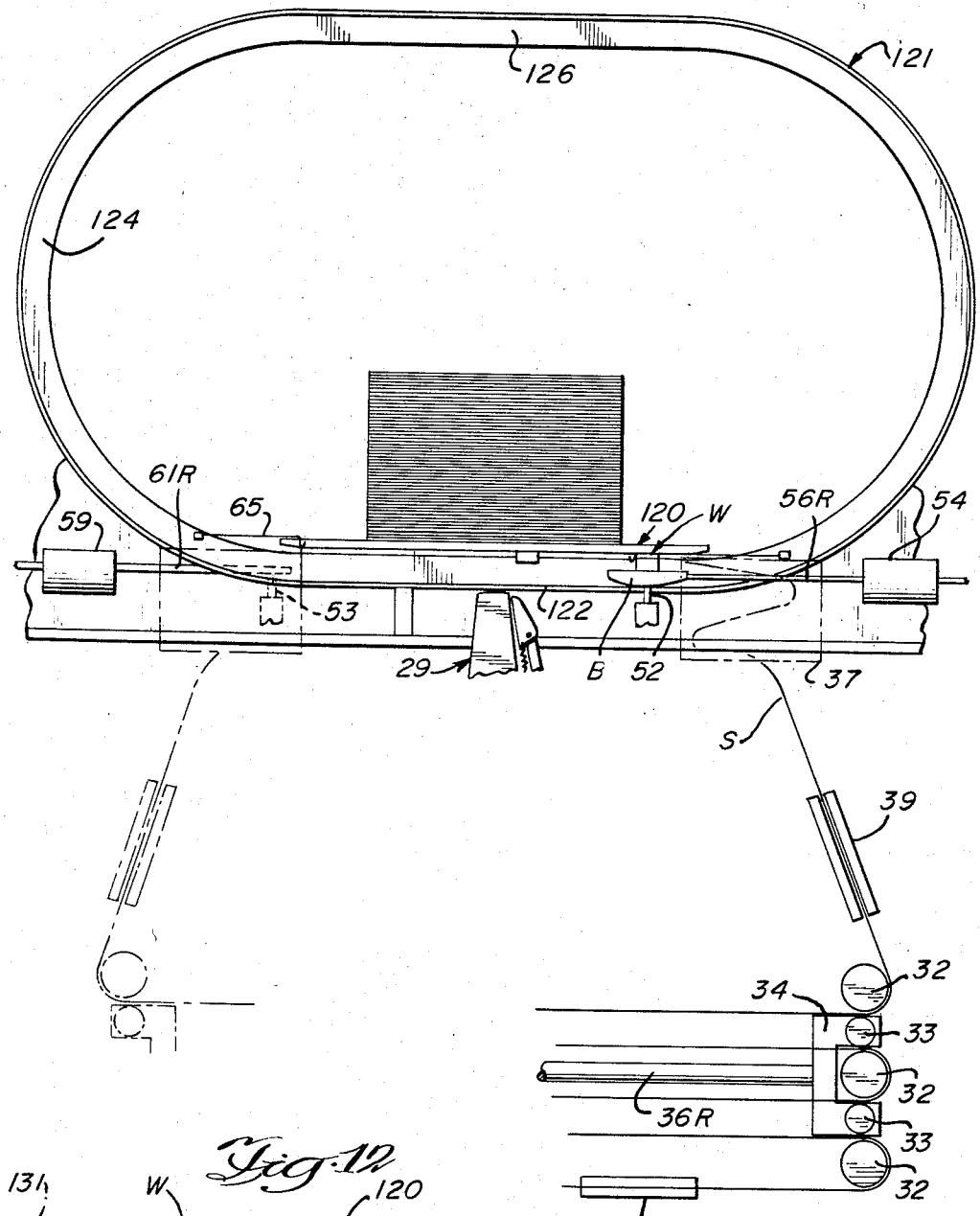
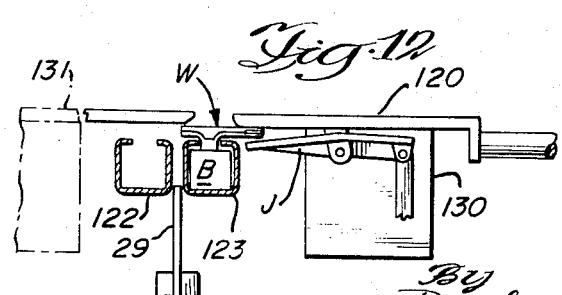

United States Patent Office 3,331,312
Patented July 18, 1967

3,331,312
STRAP DRAPING SYSTEM
John H. Leslie, Winnetka, Donald W. Noren, Morton Grove, and Hobart P. Young, Winnetka, Ill., assignors to Signode Corporation, a corporation of Delaware
Filed Aug. 24, 1965, Ser. No. 482,093
19 Claims. (Cl. 100—28)

This invention relates to systems for draping and tying a loop of strap about a package or other object to be tied and, more particularly, the invention is concerned with a method and an apparatus for effecting draping of a loop of strap completely about an object without need for a conventional strap chute or strap feeding equipment.

It is frequently quite difficult to handle small, lightweight steel or plastic straps in a conventional strap chute such as is normally employed for guiding such straps around bundles and packages. This difficulty increases with the length of the chute.

In conventional strap feeding through a strap chute, it has proven extremely difficult to control accurately the amount of strap fed around a chute so as to avoid both overfeeding and underfeeding. Frequently, delicate controls have been required to measure the amount of strap being fed through a conventional chute.

These problems encountered in the present day conventional equipment are greatly aggravated by camber, curl and twist effects which are usually present in lightweight metal and non-metallic strapping.

The present invention provides a system for overcoming these problems and for eliminating the conventional strap chute. For this purpose, a guided shuttle is provided and is made to move along a track that determines a flight path encircling a package tying position.

The guided shuttle arrangement is mechanically simple making it particularly useful for power strapping applications in plants where only a minimum of maintenance is available. Moreover, the shuttle arrangement lends itself to automatic cycling and since its operating sequence involves substantially constant time factors it lends itself to simplified clock operated control systems.

Other features and advantages of the invention will be apparent from the following description and claims, and are illustrated in the accompanying drawings which show structure embodying features of the present invention and the principles thereof.

In the accompanying drawings forming a part of the specification, and in which like numerals are employed to designate like parts throughout the same, FIG. 1 is a diagrammatic front view of one embodiment of a strapping apparatus utilizing a guided shuttle or bird for draping a loop of strap about a package or other object to be tied and showing the shuttle at a start position in a guide track;

FIG. 2 is a related view and showing the shuttle at its finish position in the guide track, having draped a loop of strap about the package;

FIG. 3 is a related fragmentary view showing an intermediate position of strap slack storing mechanism;

FIG. 4 is an enlarged fragmentary side sectional view showing the shuttle latched at its start position preliminary to receiving the free strap end;

FIG. 5 is an enlarged fragmentary transverse sectional view through the center of the apparatus;

FIG. 6 is an enlarged fragmentary top plan view of a support plate arrangement employed in the region of the overlapping ends of the loop of strap to facilitate draping and sealing of the ends of the loop;

FIG. 7 is a sectional view taken as indicated on the line 7—7 of FIG. 6;

FIG. 8 is a fragmentary plan view of the shuttle illustrating strap gripping wings;

FIG. 9 is a fragmentary sectional and elevational view through the shuttle and shuttle wings;

FIG. 10 is a diagrammatic side elevational view of a slack feed and trap unit for effecting initial feeding of the free strap end and final retraction of the slack trap end;

FIG. 11 is a diagrammatic front view of strapping apparatus incorporating another embodiment of the guided shuttle principle of this invention; and FIG. 12 is a section through the center of the apparatus of FIG. 11.

Figure 1:
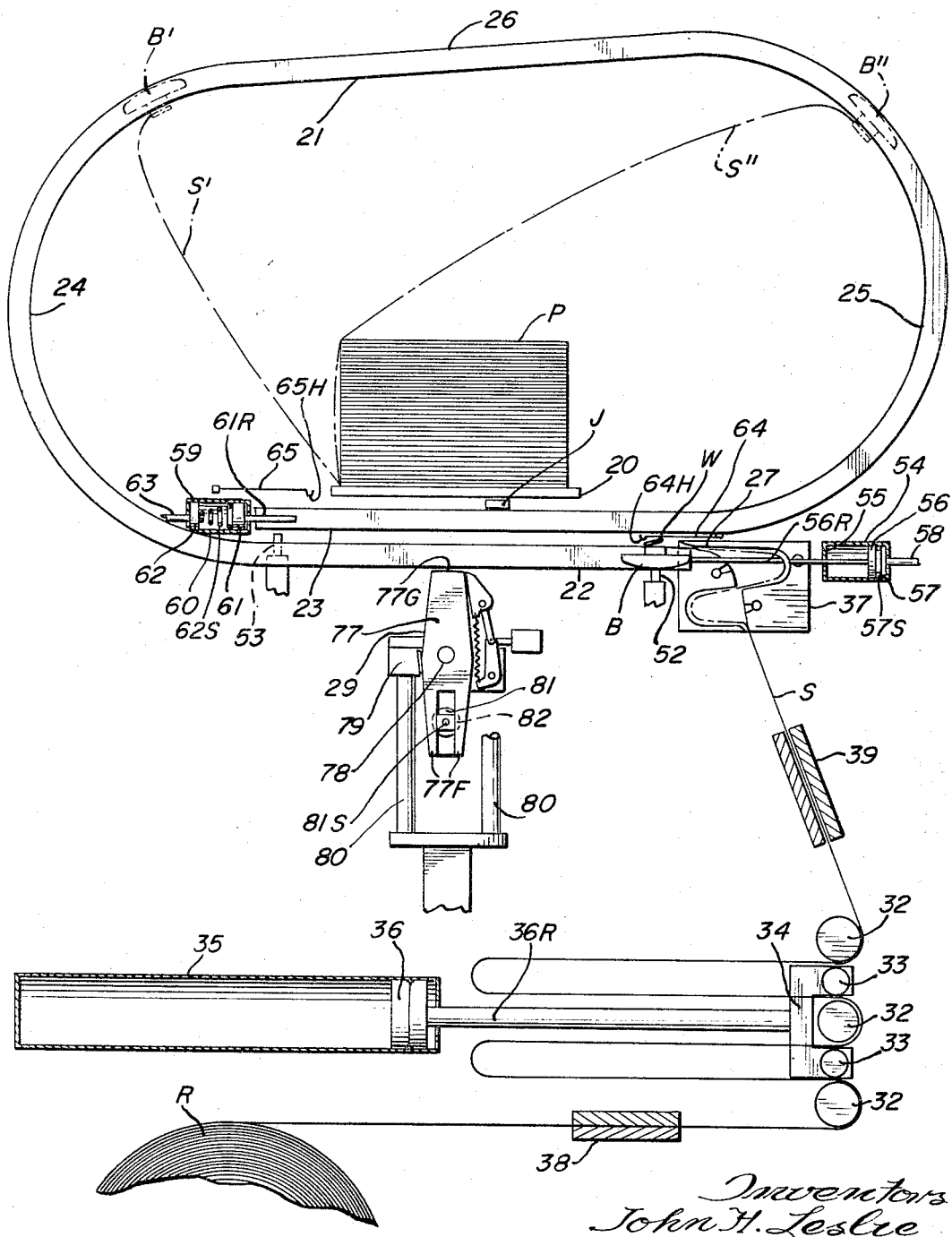

Referring now to the drawings, the general arrangement and sequence of operation of one illustrative embodiment of a guided shuttle can best be traced with reference particularly to FIGS. 1, 2 and 3. The apparatus includes main framing (not shown) mounting a support plate structure 20 determining a support position for a package P or other object which is to be tied. The main frame also supports a guide track 21 that encircles the support structure 20 and package P. In this embodiment, the guide track 21 is arrayed in a double ended split loop configuration having its start section 22 lowermost, its finish section 23 overlapping the start section, a curved return bend section 24 leading from the start section, a correspondingly curved return bend section 25 leading into the finish section, and an inclined straight section 26 joining the upper extremities of the return bend sections. The track defines a travel path for guided flight of a shuttle or bird B.

To drape a loop of strap about the package P and its support plate structure 20, a free strap end 27 is fed from a supply of strap S to gripping wings provided on the shuttle B and designated generally at W in FIGS. 1 and 2. The wings W are temporarily held open (as shown in FIG. 1) in preparation for receiving the free strap end 27 when the shuttle is at the start section 22 of the track.

The shuttle B is launched along the start section 22 with sufficient velocity to assure full loop guided flight of the shuttle to the end of the finish section 23. The kinetic energy imparted to the shuttle at launch must be sufficient to carry the strap with it during this travel and intermediate flight positions for the shuttle and strap, respectively, are designated B′, S′ and B″, S″ in FIG. 1 to illustrate the manner in which the strap is progressively drawn out and draped about the package P and its support plate structure 20. The actual launch velocity is determined by the maximum size package to be looped, the track travel characteristics, and the strap supply and strap weight characteristics.

The configuration of the shuttle flight path relative to the support structure 20 is arranged so that the strap loop enters a guideway G (FIGS. 6 and 7) provided in the support 20, with the free strap end 27 being brought adjacent and beneath an overhang 30E. This enables the free strap end to be contacted directly against an underface presented by the overhang 30E for facilitating subsequent joinder of opposite ends of the strap loop and for facilitating severance of the strap loop from the strap supply.

As is apparent in FIG. 2, the free strap end 27 does not travel with the shuttle to the extreme end of the finish section 23 of the guide track. This free end 27 is stripped from the gripping wings W by a transfer jaw J when the shuttle passes beneath the support structure 20. The jaw J is triggered by the shuttle movement to time its action appropriately for stripping the strap end 27 from the shuttle at the same point each time and in a fashion to establish an accurately controlled end point.

The strap section leading from the other end of the strap loop to the supply of strap S is designated 28 in FIG. 2 and is disposed in loose lapping relation to the strap end 27, while the strap loop is itself loosely draped about the package P and support plate structure 20.

Tension is now drawn on the strap loop by fixing the free strap end 27 with the jaw J while drawing the strap section 28 back into the strap supply. Thereafter, a sealer mechanism 29 is elevated from its FIG. 1 to FIG. 2 position and actuated to seal the overlapping ends of the strap loop. The strap section 28 is then severed from the strap loop and retracted into the strap supply, with the shuttle B being launched on a return flight along the track to return to the start section in preparation for receiving the free end of the strap from the supply.

The support track structure includes side by side plate sections 30 and 31 spaced apart, as shown in FIGS. 6 and 7, to provide the guideway G which receives the opposite ends 27 and 28 of the strap loop. Plate section 30 has a lateral extension 30E overhanging the guideway G, with the plate section 31 being correspondingly recessed and having a beveled edge face 31F bordering the guideway G to facilitate release of the strap loop after it is tensioned, sealed and severed from the strap supply.

The extension 30E serves as a contact foot located between the package and the overlapping strap ends. Accordingly, it is provided with a sealing area 30S to cooperate with the sealer mechanism 29 and a gripping area 30G to cooperate with the transfer jaw J. Each of these areas may be toothed, knurled or otherwise roughened to present optimum gripping effect against the corresponding region of the free strap end 27.

With reference to the strap track 21 of FIG. 1, it may be noted that the sections 22, 23 and 26 are straight and the reverse bend sections 24 and 25 are uniformly curved to optimize the travel characteristics of the track 21. To achieve uniform identical curvature for the two bend sections 24 and 25, the top section 26 angles upwardly sufficiently to compensate for the difference in elevation between the start section 22 and the finish section 23.

A strap supply arrangement is provided in accordance with this invention which is capable of conveniently storing slack in preparation for draping about the package, easily paying out the slack from storage to minimize the work required to be done by the shuttle, and, finally, drawing tension by pulling back the loosely draped strap, with the tension drawing operation also serving to initiate storage of slack strap for the next cycle. The illustrated strap supply system includes a supply reel R for strip stock rotatably mounted on the base of the strapping apparatus and a pulley system including a set of three fixed idlers 32 alternately arranged with a set of two floating idlers 33 carried on a movable frame 34 slidable horizontally through a strap storage compartment under the control of a cylinder 35 and a piston 36 mounted adjacent one end of the compartment.

The line of the strap supply leads from the reel R, threads reversely about successive idlers 32 and 33, comprising the pulley system, and finally extends through a slack trap 37 which has an outlet chute 37C (FIG. 10) opening adjacent to the end of the start section 22 of track for feeding the free end of the strap into the gripper wings W when the bird is parked in the start section.

Infeed and outfeed clamps 38 and 39, respectively, are associated with the line of strap supply at regions adjacent the inlet and exit of the strap storage compartment. These clamps operate in a flip-flop relationship in that the outfeed clamp 39 is open when the infeed clamp 38 is closed, as illustrated in FIG. 1, and the outfeed clamp 39 is closed when the infeed clamp 38 is open, as illustrated in FIG. 3.

The piston rod 36R is shown retracted into its cylinder 35 in FIG. 3, having shifted the movable frame 34 to its leftmost position. Thus, overlapping lengths of strap have already been drawn into the strap storage compartment from the supply reel as the infeed clamp 38 is open and the outfeed clamp 39 is closed. The cylinder 35 is then actuated to drive the piston 36 in a rightward direction to extend the piston rod 36R and movable frame 34. The lengths of strap in the storage compartment are then slack and available for easy feeding during the guided flight of the bird.

The relationship after the bird has draped a loop of strap about the package is illustrated in FIG. 2 wherein it is apparent that substantially all of the stored slack has been paid out. The outfeed clamp 39 is still open at this point and the cylinder 35 is actuated in a direction to retract the piston rod 36R and movable frame 34 for drawing slack from the draped loop until a predetermined tension is established at which point the piston stalls in its cylinder. Such an intermediate stall position is illustrated in phantom lines in FIG. 3 for the movable frame 34 and this piston 36. Before cutting the strap loop free of the strap supply, the outfeed clamp 39 is closed and the infeed clamp 38 opens, the stalled piston then continuing its travel towards the full line FIG. 3 position to again draw strap into the storage compartment for the next cycle.

The trap 37 through which the strap moves in passing from the outfeed clamp 39 to the start section 22 of the track has a pair of chambers 40 and 41 offset oppositely from a central pass line defined and bordered by separate oppositely directed strap contacting walls 40W and 41W which facilitate smooth strap travel through the trap. The line of travel of the strap through the trap as exists during the flight of the bird is illustrated in FIG. 2.

Two additional functions served by the trap are that it operates to retract the exposed strap section 28 (FIG. 2) after it has been severed from the loop and subsequently it feeds the free strap end 27 (FIGS. 1 and 10) into the gripping wings of the bird. For this purpose, each of the walls 40W and 41W is provided with an orifice 42 and 43, respectively, to direct a jet of air against the adjacent strap region at a time when the outfeed clamp 39 is closed, thus causing the strap to assume the configuration within the trap illustrated in FIG. 1 wherein it is lined against the remote walls of the chambers and has its free end terminating at the outlet of the chute 37C which exits from the upper chamber 40 of the trap. The remote wall of the upper chamber is provided with another orifice 44 opening through it to act upon the adjacent strap region and progressively feed the free end of the strap from the chute into the gripping wings W of the bird B as illustrated in FIG. 10.

The bird which is best shown in FIGS. 4, 5, 8, 9 and 10 has a weighted body 45 which includes a separate magnet insert 46 within each end. The magnets 46 control dry reed switches (not shown) to regulate turn-on and turn-off of a clock controlled timing arrangement (not shown). The clock timer is on throughout a cycle of operations with the exception that it is shut off whenever the birds in flight.

The body of the bird has an upraised central portion 45C to project through the open face of the guide track and mount the set of upper and lower overlapping gripping wings W which are designated individually at 47 and 48, respectively. The gripping wings W have laterally extending edges 47E and 48E disposed outboard of the plane of the track and presenting opposed strap contacting surfaces which are separable to accommodate entry of the free strap end 27 and which are thereafter clamped in sandwiched relation upon the free strap end for towing the strap during the flight of the bird. The bottom wing 48 is held in fixed position upon the raised region of the body of the bird by means of a headed bolt 49 while the upper wing 47 has a central recess surrounding the bolt head 49H and has sockets 47S flanking the clearance opening and each receiving the upper end of a separate actuator rod 50, 51 and a transverse mounting pin 50P, 51P which pivotally connects each rod with the upper wing. Each actuator rod 50, 51 has a lower end enlargement 50E, 51E serving as a seat for a coil spring 50S, 51S encircling each rod and reacting against the fixed wing 48 normally to bias the rod 50, 51 and hence the upper wing 47 to a strap contacting position.

When the bird is parked in the start section of the track, a diaphragm actuated lift rod 52 is operable through an access opening 22A in the track to contact and elevate the actuator rod 51 and effect upward swinging movement of the upper wing 47 about the mounting pin 50P for the companion actuator rod 50. This opens the wings for receiving the free strap end 27. Correspondingly, when the bird is parked at the end of the finish section 23 of the track as shown in FIG. 2, a diaphragm actuated lift rod 53 is operable through an access opening (not shown) in the track to contact and elevate the other actuator rod 50 and swing the upper wing upwardly about the transverse pivot pin 51P. No strap insertion or gripping or release operation is involved when the bird is parked at the end of the finish section 23 of the track and this lifting action on the wings is provided to effect escape of the bird from its parked position as is now explained in relation to the bird launching and anti-recoil facilities.

In the illustrative structure disclosed herein, launch energy is imparted to the bird by a momentary impact. For this purpose, a launch gun 54 is aligned endwise with the start section 22 of the track and includes a pneumatic cylinder 55, a piston 56 reversibly operable therein and having an impact rod 56R for endwise engagement with the bird. An air valve 57 is mounted on one end of the cylinder 55 and fed from an air line 58 to control rapid dumping of air into the cylinder at launch. The bird is thus accelerated during an initial travel along the start section 22 corresponding to the travel of the impact rod 56R imparted by the piston 56. Thereafter, the bird travels along the guided flight path determined by the track.

A similar launch arrangement is aligned endwise with the finish section 23 of the track for returning the bird for the next draping cycle. Thus, the return launch gun 59 includes a pneumatic cylinder 60 having a piston 61 carrying an impact rod 61R, with an air valve 62 shown at the opposite end of the cylinder and fed through an air line 63.

In the interest of assuring reliable full flight travel of the bird, it is given an initial launch velocity high enough that it arrives with a significant terminal velocity. In particular as is apparent in FIG. 1, the impact rod 61R of the finish end launch gun 59 is extended to serve in cushioning the arrival of the bird, with the impact of the bird against this rod serving to effect return of the piston 61 to its launch position, which is illustrated in FIG. 2. Similarly, when the bird is launched towards the start section of track, it impacts the extended impact rod 56R to effect return of the piston 56 for the start end launch gun 54. At either end the arrival impact has a recoil effect associated with it. To prevent rebounding of the bird and to establish an accurate parked position, a latch 64 in the form of a leaf spring is associated with the start section 22 and terminates in a hook portion 64H which is engageable over the end edge of the upper bird wing 47 to retain the bird (FIG. 4). A similar latch 65 is associated with the finish section 23 and terminates in a hook portion 65H engageable with the opposite end of the upper bird wing 47 (FIG. 2).

In the disclosed arrangement, the valve 57, 62 of each launch gun is provided with a release spring 57S (FIG. 2) and 62S (FIG. 1) to store energy as the bird arrives and returns the piston 56, 61, respectively, to its launch position. The release spring then tends to move the bird an incremental distance away from its parked position but the corresponding latch 64, 65 prevents this movement. With particular reference to the start section 22, the lift rod 52 is shown elevated in FIG. 1, to elevate the actuator rod 51 and open the gripping wings 47 and 48. The movement of the upper wing 47 cams the latch 64 free but the release spring (not shown) cannot advance the bird because the lift rod 52 itself prevents any bird movement until it returns to its lower position. The release spring then operates to advance the bird before the latch 64 can reenegage, with only a slight movement of the bird being required to prevent the latch hook from catching the end edge of the upper wing. This released position of the bird in the start section 22 is illustrated in FIG. 9 wherein the latch hook 64H is shown seated on top of the closed upper wing 47. The bird is now free to be launched.

One form for the transfer jaw J is shown in FIG. 5 in which the bird B is represented in inverted position intermediately along the straight top section 26. Correspondingly, the sealer mechanism 29 is shown retracted in FIG. 5 as is appropriate when the bird is in the midst of its draping flight.

To detect the bird as it moves along the finish section 23, a control switch 66 is represented as having a swingable actuator arm 66A fitted with a cam wheel 66W which projects into the path of the bird moving along the finish section 23. The transfer jaw J is represented in open position underlying the plate section 31. The jaw is pivoted centrally on a fixed shaft 67 and has a drive end 68 connected to a toggle linkage comprised of upper and lower toggle links 69 and 70, respectively, connected by a pivot pin 71. A push-type solenoid 72 controlled from the sense switch 66 has an armature terminating in a bumper 73 operable to shift the toggle linkage over center to cause the face of the jaw J to pivot upwardly towards the gripper surface 30G presented by the overhang 30E. A return cylinder 74 has a piston rod 75 which is shown opposing the bumper 73 on the solenoid, the return cylinder 74 being controlled to yield for enabling actuation of the toggle links 69 and 70 for closing the jaw J and the return cylinder 74 thereafter being activated to reset the toggle links 69 and 70 until the next draping flight of the bird actuates the sense switch 66. It may be noted that the return flight of the bird contacts the wheel of the sense switch and transfer jaw actuation is prevented by loading the return cylinder 74 to a force level greater than that of the solenoid. A load spring 84 is mounted on a bolt 76 carried on the table section 31 to load the transfer jaw against the strap end 27 tightly enough to strip it from the bird wings and thereafter to hold it fixed during the strap tensioning sequence.

The sealer mechanism 29 is shiftable vertically between a retracted inoperative position in which it is illustrated in FIGS. 1 and 5 and an elevated operative position in which it is illustrated in FIG. 2. The sealer mechanism 29 assumes the operative position after the strap is draped about the package and tensioned and as disclosed herein, it functions to fuse the overlapping strap ends 27 and 28 together to complete the strap loop.

The sealer mechanism consists of a vertical swing arm 77 which is mounted to a pivot shaft 78 carried in the top of a transverse mounting frame 79. The mounting frame 79 has opposite ends (FIGS. 1 and 2) fixed to a pair of lifter rods 80 that are shiftable vertically to bring the swing arm into strap compressing engagement beneath the gripper surfaces 30G. The actual lifting mechanism associated with the lifter rods 80 is not shown in detail but may be of any pneumatic or similar type capable of effecting and maintaining prescribed uniform pressure between the strap gripping faces. The movable gripper face 77G presented by the swing arm 77 is arcuate and curves about the shaft 78 as a center of rotation. Likewise, the stationary gripper face 30G is arcuate and curved about the shaft 78 as a center.

In the form of sealer mechanism disclosed herein, the fusion joint is formed between parallel arcuate strap portions by means of longitudinal oscillating travel generated along an arcuate path. Oscillating movement is imparted to the swing arm 77 by means of a pneumatic, hydraulic or electric motor 81 which is associated with a lower end region of the swing arm. This lower end region of the swing arm has parallel vertical edge flanges 77F to present a channel-like cross-section for defining a radial guideway in which a rectangular oilite bearing block 82 is slidable. An eccentric stub end of a motor shaft 81S is journaled in this bearing block 82. The stub end of the motor shaft 81S is offset from the shaft axis to drive the block 82 through a circular orbit. The eccentric travel at this point acts only horizontally on the swing arm.

When a loop has been completely formed about an object to be tied and the overlapping ends are engaged between the gripper faces 30G and 77G, the motor is energized for about a one-half second time interval and the face 77G executes a longitudinally oscillating mode of movement at an amplitude, peak to peak, of 0.100 inch and a frequency of 5000 cycles per minute. This develops a total sliding friction travel at substantially all strap surface points wtihin the interface region of about 10 inches a value sufficient to bring the contacting surfaces to melting temperature in the case of polypropylene strap. The interface surfaces will begin to bond at this time if power to the motor is cut off, solidification actually beginning while the motor shaft damps to a stop. The load pressure on the interface surfaces is maintained for a cooling interval during which substantially complete solidification occurs. After the cooling interval elapses, a cutter element 83 mounted closely alongside the swing arm 77 severs the strap. Cutting of the strap is accomplished as close to the fused area of the joint as practical in order to avoid elongated exposed tabs extending from the sealed joint.

*Operation*

The detailed sequence of operation may now be described beginning with FIG. 4 wherein the bird B is at its parked position in the start section 22 of the track. The gripping wings are opened to the FIG. 1 position by elevating the lift rod 52 and the free strap end 27 is in the outlet chute of the trap 37 ready to be fed into the wings. At this position, the latch hook 64H has cammed free and the bird is held in parked position only by the lift rod 52. Air is applied to the feed orifice 44 of the trap 37 to feed the free strap end 27 from the upper chamber 40 to enter between the open wings 47 and 48 (FIG. 10). The lift rod 52 is retracted and the release spring (not shown) advances the bird to its FIG. 9 position wherein the latch hook 64H rests freely on top of the upper wing 47. The start end launch gun 54 is fired to send the bird through its draping flight and towards the parked position illustrated in FIG. 2 wherein the release spring (not shown) in the return launch gun 59 is cocked and the latch 65 retains the bird.

As the bird passes beneath the support plate structure 20, the free strap end 27 is caught by the transfer jaw J on being triggered by the wheel 66W of the sense switch 66. Continued movement of the bird strips the caught free strap end from the gripping wings. The outfeed clamp 39 is open and the infeed clamp 38 is closed and the strap supply cylinder 35 is operated to retract the movable frame 34 from its FIG. 2 position towards its FIG. 3 position for drawing tension on the loop. Normally, the piston 36 stalls at an intermediate point of this retraction stroke as indicated in phantom lines in FIG. 3. The clamps are then flip-flopped to the FIG. 3 position so that the retraction stroke may continue for drawing slack into the storage chamber. The piston thereafter returns to its FIG. 1 position to make the slack available for feeding in the next cycle.

In the meantime, the sealer mechanism 29 is elevated to its FIG. 2 position and then actuated to seal the overlapping ends 27 and 28 of the strap loop. After sealing, the cutter element 83 severs the strap section 28 and the sealer mechanism is retracted. Air is applied to each of the retraction orifices 42 and 43 in the trap 37 for drawing back the strap section 28 until it lines the trap chambers 40 and 41 in the configuration illustrated in FIG. 1. The lift rod at the finish section of track is then elevated to cam the latch 65 free of the wings and upon retraction of the lift rod, the release spring advances the bird from its parked position. The launch gun 59 then fires to effect the return flight of the bird to its parked position in the start section 22 (FIG. 4).

*Alternative embodiment*

Another embodiment of the invention is illustrated in FIGS. 11 and 12 and the principal control components bear the same reference characters. The primary difference resides in the fact that the guide track 121 has a helical configuration such that the finish section 123 lies horizontally alongside the start section 122. The parts of the guide track are correspondingly numbered in the 100 series and the support plate structure 120 for the package is numbered in the 100 series to denote differences in construction. As is best seen in FIG. 12, the support table 120 has a transfer slide 130 which carries the transfer jaw J. The relationship of the guide track 120 is such that the flying shuttle or bird B drapes one turn of strap loosely and in a helical configuration about the package. The free strap end 27 is grabbed by the transfer jaw J as the shuttle moves along the finish section 123 of the track thereby automatically stripping the strap from the wings of the shuttle. A free end of strap of about two inches in length is exposed for later use in sealing with the strap section at the opposite end of the draped loop. In the embodiment of FIGS. 11 and 12, the arrival of the shuttle at parked position in the finish section of track actuates positioning mechanism (not shown) for shifting the transfer slide 130 and transfer jaw J in a direction to bring the free strap end 27 into lapping relation with the opposite end of the strap loop. Thereafter, the tensioning sequence is effected, the strap ends are sealed and the completed loop is severed from the strap supply.

While the helical track configuration of this embodiment requires additional mechanism for controlling the transfer slide, the configuration lends itself to a double-ended strapping system in that successive cycles are alternately effected by draping the loop of strap in opposite directions with no return of the shuttle required between cycles. For this purpose, a companion transfer slide 131 is shown in phanom in FIG. 12 and a companion strap supply, strap storage compartment and strap feed are shown in phantom in FIG. 11.

Thus, while preferred constructional features of the invention are embodied in the structure illustrated herein, it is to be understood that changes and variations may be made by those skilled in the art without departing from the spirit and scope of the appended claims.

What is claimed is:

1. In apparatus for forming a loop of strip stock about an object located at a support position, a weighted bird having means for gripping a free end from a supply of strip stock, track means determining a split loop travel path encircling the object support position and terminating in adjacent start and finish track sections, and launch means adjacent the start section to accelerate the bird sufficiently to impart guided flight thereof full length of the travel path for drawing a length of strip stock therewith to drape the same in a loop about an object at the support position.

2. In apparatus for forming a loop of strip stock about an object located at a support position, track means determining a split loop travel path encircling the object support position and terminating in adjacent start and finish track sections underlying the support position, means for holding a supply of strip stock presenting a free end adjacent the start section, a weighted bird in said start section and having means for gripping the free end from the supply of strip stock, and lanuch means adjacent the start end to accelerate the bird sufficiently to impart guided flight full length of the travel path for drawing a length of strip stock therewith to drape the same in a loop about an object at the support position.

3. In apparatus for forming a loop of strip stock about an object located across a guideway provided intermediately at a support position, a weighted bird having means for gripping a free end from a supply of strip stock, track means determining a split loop travel path encircling the object support position and terminating in start and finish track sections underlying the support position adjacent to the guideway, and lanuch means adjacent the start section to accelerate the bird sufficiently to impart guided flight thereof full length of the travel path for drawing a length of strip stock therewith to drape the same in a loop intersecting and exending through the guideway and encircling an object at the support position.

4. In apparatus for forming and tying a loop of strip stock about an object, a weighted bird for gripping engagement with a lead end from a supply of strip stock, track means determining a travel path encircling the object, launch means to accelerate the bird at the start of the travel path and enable full flight of the bird along the travel path for drawing a length of strip stock therewith to drape the same in a loop about the object, means for drawing tension on the loop, and means for connecting opposite ends of the tensioned loop of strip stock.

5. In apparatus for forming and tying a loop of strip stock about an object, a weighted bird for gripping engagement with a free end from a supply of strip stock, track means determining a travel path encircling the object, means for pulling slack in the supply of strip stock for easy pay out upon movement of said free end, launch means to accelerate the bird at the start of the travel path and enable full flight of the bird along the travel path for drawing a length of strip stock from said supply to drape the same in a loop about the object, means for drawing tension on the loop, and means for connecting opposite ends of the tensioned loop of strip stock.

6. In apparatus for forming and tying a loop of strap about an object positioned upon support structure, a weighted bird for gripping engagement with a free end from a supply of strap, track means determining a travel path encircling the object and support structure and having overlapping start and finish ends underlying and adjacent to said support structure, launch means to accelerate the bird at the start of the travel path sufficiently to enable full flight of the bird along the travel path for drawing a length of strap therewith to drape the same in a loop having overlapping strap ends adjacent said support structure, means for drawing tension on the loop, and means for directly joining the overlapping ends of the tensioned loop.

7. In apparatus for forming and tying a loop of strap about an object positioned upon a support structure, a weighted bird for gripping engagement with a free end from a supply of strap, track means determining a split loop travel path encircling the object and support structure and having overlapping start and finish sections underlying and adjacent to said support structure, impact means engageable when the bird is in the start section to accelerate the bird sufficiently to enable full flight of the bird along the travel path for drawing a length of strap therewith to drape the same in a loop about the object and the support structure, means for drawing tension on the loop, and means for connecting opposite ends of the tensioned loop.

8. In apparatus for forming and tying a loop of strap about an object positioned upon a support structure, a weighted bird for gripping engagement with a free end from a supply of strap, track means determining a travel path of split loop configuration encircling the object and having overlapping start and finish sections, impact means engageable when the bird is in the start section to accelerate the bird sufficiently to enable full flight around the travel path while drawing a length of strap therewith to drape the same in a loop about the object, a transfer jaw to catch and hold the lead end during travel of the bird along the finish section to enable continued movement of the bird to strip said lead end free of the bird, means for retracting strap into the supply while the jaw holds the lead end for drawings tension on the loop, and means for connecting opposite ends of the tensioned loop.

9. In apparatus for forming and tying a loop of strip stock about an object, a weighted bird carrying clamp means for gripping engagement with a lead end from a supply of strip stock, split loop track means defining a travel path for the bird, said track means encircling the object and having overlapping start and finish track sections each equipped with retention means for temporarily holding the bird parked in such track section, means for loading a lead end of strip stock into gripped engagement in said clamp means when the bird is in said start track section, launch means operable after the corresponding retention means is released to accelerate the bird along the start section and enable full flight of the bird along the travel path for drawing a length of strip stock therewith to drape the same in a loop about the object, transfer jaw means responsive to movement of the bird along said finish section for catching and holding the gripped end of the strip stock to enable continued movement of the bird to free the clamp means from said gripped end, means for retracting the strip stock into the supply through the start section of the track means to draw tension on the loop, means for connecting opposite ends of the tensioned loop, and means for cutting the loop free of the supply.

10. In apparatus for forming and tying a loop of strip stock about an object located at a support position, a weighted bird carrying clamp means for gripping engagement with an end of the strip stock, split loop track means defining a travel path for the bird, said track means encircling the object and having overlapping start and finish track sections each equipped with retention means for holding the bird parked in such track section, said retention means being releaseable upon opening of said clamp means, release means at each of said track sections and engageable to open the clamp means when the bird is parked in the corresponding track section, jet feed means for loading a free lead end of strip stock into gripped engagement in said clamp means when the same are open, launch means to accelerate the bird along the start section and enable full flight of the bird along the travel path for drawing a length of strip stock therewith to drape the same in a loop about the object, transfer jaw means responsive to movement of the bird along said finish section for catching and holding the gripped end of the strip stock to enable continued movement of the bird to free the clamp means from said gripped end, means for retracting the strip stock from the start section of the track means through the jet feed means to draw tension on the loop, means for connecting opposite ends of the tensioned loop, and means for cutting the loop free of the strip stock remaining in said start end, said jet feed means having a slack trap chamber to receive the strip stock remaining in the start end for subsequent feeding to the open clamp means in loading the bird for forming the next loop.

11. In apparatus for forming a tensioned loop of strap about an object positioned upon support structure, track means determining a split loop travel path encircling the object and support structure and having overlapping start and finish sections, a weighted bird movable in said track means and having gripping means extending outboard of the track means for gripping engagement with a free strap end from a supply of strap leading from adjacent the start section, means providing easy payout from the supply of strap upon movement of said free end along the travel path, launch means to accelerate the bird at the start section of the travel path sufficiently to enable full flight of the bird along the travel path for drawing a length of strap therewith to drape the same in an object encircling strap loop, a transfer jaw mounted adjacent the track means and responsive during travel of the bird along the finish section to catch and hold a strap portion adjacent one end of the strap loop, and means operable on a strap portion adjacent the other end of the strap loop for pulling tension on the loop.

12. In apparatus for forming a tensioned loop of strap about an object, support structure defining a support position for an object and having a strap guideway extending intermediately through said support position, track means determining a split loop travel path encircling the object and support structure at a location adjacent the guideway and having overlapping start and finish sections, a weighted bird movable in said track means and having gripping means extending outboard of the track means for gripping engagement with a free strap end from a supply of strap leading to adjacent the start section, means for providing easy payout from the supply of strap upon movement of said free end along the travel path, launch means to accelerate the bird at the start section of the travel path sufficiently to enable full flight of the bird along the travel path for drawing a length of strap therewith to drape the same in an object encircling strap loop intersecting and extending through the guideway, a transfer jaw mounted adjacent the track means and responsive when the bird is in the finish section to catch and hold a strap portion adjacent one end of the strap loop, and means operable on a strap portion adjacent the other end of the strap loop for pulling tension on the loop.

13. In apparatus for forming a tensioned loop of strap about an object positioned upon support structure, track means determining a split loop travel path encircling the object and support structure and having overlapping start and finish sections, a weighted bird movable in said track means and having gripping means extending outboard of the track means for gripping engagement with a free strap end from a supply of strap, means providing easy payout from the supply of strap upon movement of said free end along the travel path, launch means to accelerate the bird at the start section of the travel path sufficiently to enable full flight of the bird along the travel path for drawing a length of strap therewith to drape the same in a loop about the object and the support structure, a transfer jaw mounted adjacent the finish section and responsive during travel of the bird along the finish section to catch the said free strap end and hold the same, and means for retracting strap into the supply for pulling tension on the loop.

14. In apparatus for forming a tensioned loop of strap about an object, support structure defining a support position for an object and having a strap guideway extending intermediately through said support position, track means determining a split loop travel path encircling the object and support structure at a location adjacent the guideway and having overlapping start and finish sections, a weighted bird movable in said track means and having gripping means extending outboard of the track means for gripping engagement with a free strap end from a supply of strap located adjacent the start section, means providing easy payout from the supply of strap upon movement of said free end along the travel path, launch means to accelerate the bird at the start section of the travel path sufficiently to enable full flight of the bird along the travel path for drawing a length of strap therewith to drape the same in an object encircling loop intersecting and extending through the guideway, a transfer jaw mounted adjacent the finish section and responsive during travel of the bird along the finish section to catch the said free strap end and hold the same, and means for retracting strap into the supply for pulling tension on the loop.

15. In apparatus for forming and tying a tensioned loop of strap about an object positioned upon support structure, track means determining a split loop travel path encircling the object and support structure and having overlapping start and finish sections, a weighted bird movable in said track means and having gripping means extending outboard of the track means for gripping engagement with a free strap end from a supply of strap leading from adjacent the start section, means providing easy payout from the supply of strap upon movement of said free end along the travel path, launch means to accelerate the bird at the start section of the travel path sufficiently to enable full flight of the bird along the travel path for drawing a length of strap therewith to drape the same in an object encircling strap loop, a transfer jaw mounted adjacent the track means and responsive when the bird is along the finish section to catch and hold a strap portion adjacent one end of the strap loop, means operable on a strap portion adjacent the other end of the strap loop for pulling tension on the loop to bring opposite ends of the loop into flush overlapping relation beneath the support structure, and means for directly joining the overlapping ends of the tensioned loop.

16. In apparatus for forming and tying a tensioned loop of strap about an object, support structure defining a support position for an object and having a strap guideway extending intermediately through said support position, track means determining a split loop travel path encircling the object and support structure at a location adjacent the guideway and having overlapping start and finish sections, a weighted bird movable in said track means and having gripping means extending outboard of the track means for gripping engagement with a free strap end from a supply of strap leading to adjacent the start section, means for storing slack in the supply of strap for easy payout upon movement of said free end along the travel path, launch means to accelerate the bird at the start section of the travel path sufficiently to enable full flight of the bird along the travel path for drawing a length of strap therewith to drape the same in an object encircling strap loop intersecting and extending through the guideway, a transfer jaw mounted adjacent the track means and responsive when the bird is in the finish section to catch and hold a strap portion adjacent one end of the strap loop, means operable on a strap portion adjacent the other end of the strap loop for pulling tension on the loop to bring opposite ends of the loop into flush overlapping relation beneath the support structure, and means for directly joining the overlapping ends of the tensioned loop.

17. In apparatus for forming and tying a loop of strap about an object, support structure defining a support position for an object and having a strap guideway extending intermediately through said support position, track means determining a split loop travel path encircling the object and support structure at a location adjacent the guideway and having overlapping start and finish sections underlying and adjacent to said support structure, a weighted bird movable in said track means and having gripping means extending outboard of the track means for gripping engagement with a free strap end from a supply of strap leading to adjacent the start section, means for storing slack in the supply of strap for easy payout upon movement of said free end along the travel path, launch means to accelerate the bird at the start section of the travel path sufficiently to enable full flight of the bird along the travel path for drawing a length of strap therewith to drape the same in an object encircling strap loop interesecting and extending through the guideway, a transfer jaw mounted to underlie the support structure and responsive when the bird is in the finish section to catch the said free end and hold the same, means for retracting strap into the supply for pulling tension on the strap loop and bringing opposite ends of the strap loop into adjacency, and means for connecting said opposite ends of the tensioned strap loop.

18. Apparatus in accordance with claim 17 and wherein said track means is uniplanar.

19. Apparatus in accordance with claim 17 and wherein said track means is helical.

References Cited

UNITED STATES PATENTS

| 2,198,440 | 4/1940 | Marchand | 100—27 |
| 2,262,232 | 11/1941 | Harvey | 100—27 |
| 2,630,751 | 3/1953 | Cranston et al. | 100—27 |
| 3,045,584 | 7/1962 | Willis et al. | 100—27 |
| 3,137,426 | 6/1964 | Brenneisen | 100—26 |

BILLY J. WILHITE, *Primary Examiner.*